United States Patent [19]

Kiehs et al.

[11] 3,904,673

[45] Sept. 9, 1975

[54] N-CARBAMOYLOXYALKYL-SUBSTITUTED DINITROANILINES

[75] Inventors: Karl Kiehs, Lamperthein; Karl-Heinz Koenig, Frankenthal; Adolf Fischer, Mutterstadt, all of Germany

[73] Assignee: Badische Anilin- & Soda-Fabrik Aktiengesellschaft, Ludwigshafen (Rhine), Germany

[22] Filed: Oct. 13, 1972

[21] Appl. No.: 297,203

Related U.S. Application Data

[62] Division of Ser. No. 170,248, Aug. 9, 1971, Pat. No. 3,770,779.

[30] Foreign Application Priority Data

Sept. 2, 1970 Germany............................ 2043442

[52] U.S. Cl................................................ 260/482 C
[51] Int. Cl.$^2$..................................... C07C 125/06
[58] Field of Search ..................... 260/482 C, 412 B

[56] References Cited
UNITED STATES PATENTS

| | | | |
|---|---|---|---|
| 3,103,533 | 9/1963 | Youngdale...................... | 260/482 C |
| 3,265,727 | 8/1966 | Bossinger et al................ | 260/482 C |
| 3,265,728 | 8/1966 | Bossinger et al................ | 260/482 C |
| 3,458,639 | 7/1969 | Heiss et al....................... | 260/482 C |

*Primary Examiner*—Lorraine A. Weinberger
*Assistant Examiner*—Paul J. Killos

[57] ABSTRACT

N-carbamoyloxyalkyl-substituted dinitroanilines having a good herbicidal action and a process for controlling the growth of unwanted plants with these compounds.

5 Claims, No Drawings

N-CARBAMOYLOX YALKYL-SUBSTITUTED DINITROANILINES

RELATED APPLICATION

This application is a division of our copending application Ser. No. 170,278, filed Aug. 9, 1971, now U.S. Pat. No. 3,770,779.

The present invention relates to new and valuable substituted dinitroanilines having a good herbicidal action and the use of these compounds as herbicides.

It is known to use 4-trifluoromethyl-2,6-dinitro-N,N-dipropylaniline as herbicide. However, its action is not satisfactory.

We have now found that substituted dinitroanilines of the formula

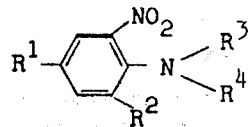

where one of the radicals $R^1$ and $R^2$ denotes nitro and the other denotes methyl, trifluoromethyl or methylsulfonyl, $R^3$ denotes carbamoyloxyethyl or 2-carbamoyloxypropyl, (N-methylcarbamoyl or N-ethylcarbamoyl), and $R^4$ has the same meanings as $R^3$ and may additionally denote hydrogen, bromoethyl, alkylthioalkyl (having up to 4 carbon atoms), or linear or branched alkyl, alkenyl or alkynyl each having up to 4 carbon atoms, hydroxyethyl, 2-hydroxypropyl, alkoxyalkyl (methoxyethyl, ethoxyethyl, 2-methoxypropyl, 2-ethoxypropyl), cyanomethyl, cyanoethyl or chloroethyl, have a good herbicidal action.

The action is particularly in evidence on millet species when the compounds are used preemergence and at application rates of 0.5 to 3 kg per hectare. The active ingredients are suitable for controlling unwanted plants in crops such as soya beans, cotton or Indian corn.

The new active ingredients are yellow crystalline substances or non-distillable oils.

The new compounds are produced in accordance with the following equation:

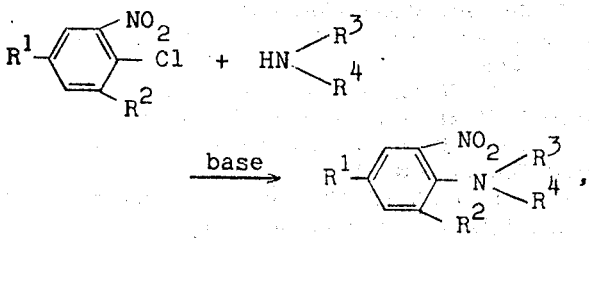

where $R^1$ and $R^2$ have the meanings given above and $R^3$ denotes hydroxyethyl or 2-hydroxypropyl, and $R^4$ denotes the same radicals as $R^3$ and additionally linear or branched alkyl, alkenyl or alkynyl each having up to 4 carbon atoms, alkoxyalkyl, cyanomethyl or cyanoethyl.

The compounds thus obtained may be reacted in conventional manner with halogenating agents ($COCl_2$, $SOCl_2$, $SOBr_2$, $PBr_3$) or acylating agents (acid chlorides, isocyanates) to give the products of the invention.

The suitably substituted secondary amines may also be reacted direct to form the products of the invention in accordance with the above equation.

Starting materials and intermediates may be produced for instance by the processes of U.S. Pat. Nos. 2,257,093 and 3,227,734 and in accordance with Journal of the Chemical Society, London, 1949, 190, Suppl.

EXAMPLE 1

N-methylthioethyl-N-hydroxyethyl-2,6-dinitro-4-trifluoromethylaniline:

54 parts (by weight) of 2,6-dinitro-4-trifluoromethyl-chlorobenzene is dissolved in 250 parts of tetrahydrofuran or benzene; subsequently, a mixture of 28.4 parts of N-methylthioethylaminoethanol and 20.2 parts of triethylamine is slowly added, and the whole is stirred for 2 hours at 50° to 60°C. After the triethylammonium hydrochloride has been filtered off, the filtrate is concentrated in vacuo and the residue recrystallized from ethanol. Melting point: 60° to 62°C; yield: 96 percent.

EXAMPLE 2

N-methoxyethyl-N-methylcarbamoyloxyethyl)-2,6-dinitro-4-trifluoromethylaniline:

17.7 parts of N-methoxyethyl-N-hydroxyethyl-2,6-dinitro-4-trifloromethylaniline (prepared as in Example 1; m.p.: 35° to 37°C) is dissolved in 50 parts of acetone; a few drops of triethylamine are added, and 3.1 parts of methyl isocyanate is introduced. The mixture is subsequently stirred for 3 hours at about 40°C, the solvent is then distilled off, the residue is taken up in methylene chloride, and the solution is washed with water and again concentrated. A dark oil is obtained. $N_D{}^{25} = 1.5270$.

The following compounds were prepared in the same way as in these examples:

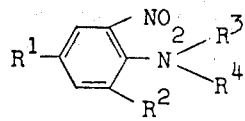

| $R^1$ | $R^2$ | $R^4$ | $R^3$ | |
|---|---|---|---|---|
| $CH_3SO_2$ | $NO_2$ | $n-C_3H_7$ | $CH_2-CH_2-O-CONHCH_3$ | |
| $CH_3$ | $NO_2$ | allyl | $CH_2-CH_2-O-CONHCH_3$ | |
| $CF_3$ | $NO_2$ | $CH-C \equiv CH$ | $CH_2-CH_2-O-CONHCH_3$ | |
| $CF_3$ | $NO_2$ | $n-C_3H_7$ | $CH_2-CH_2O-CONHCH_3$ | |
| $CF_3$ | $NO_2$ | $n-C_3H_7$ | $CH_2-CH_2-OCONHC_2H_5$ | |
| $CF_3$ | $NO_2$ | allyl | $CH_2-CH_2-O-CONH-CH_3 n_D{}^{25}$ | 1.5330 |
| $CH_3SO_2$ | $NO_2$ | allyl | $CH_2-CH_2-O-CONHC_2H_5$ | |
| $CH_3SO_2$ | $NO_2$ | $CH_2-CH_2-O-CONHCH_3$ | H | |
| $CH_3SO_2$ | $NO_2$ | $CH_2-CH_2-O-CONHC_2H_5$ | H | |
| $CF_3$ | $NO_2$ | $CH_2-CH_2-O-CONHCH_3$ | H m.p.107 to 108°C | |
| $CF_3$ | $NO_2$ | $CH_2-CH_2-O-CONHC_2H_5$ | H | |
| $CF_3$ | $NO_2$ | $CH_2-CH(CH_3)-O-CONHCH_3 n-C_3H_7$ | | |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e. g. kieselguhr, talc, clay or fertilizers.

The following experiments demonstrate the biological action of the new compounds.

EXAMPLE 3

In a greenhouse, loamy sandy soil was filled into pots and sown with *Zea mays, Gossypium hirsutum, Soja hispida, Poa trivialis, Lolium multiflorum, Echinochloa crus-galli, Digitaria sanguinalis* and *Setaria spec*.

The soil was then treated with 3 kg per hectare of each of the following active ingredients, each amount being dispersed in 500 liters of water per hectare:

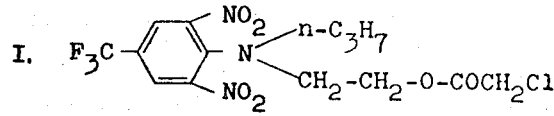

II. N-β-(methylcarbamoyloxy)-ethyl-2,6-dinitro-4-trifluoromethylaniline
III. N-β-(chloroacetoxy)-ethyl-2,6-dinitro-4-trifluoromethylaniline
IV. N,N-bis-[β-γ-(chloroacetoxy)-ethyl]-2,6-dinitro-4-trifluoromethylaniline
V. 4-trifluoromethyl-2,6-dinitro-N,N-dipropylaniline.

After 3 weeks I, II, III and IV had, compared with V, superior compatibility with the crop plants combined with a good herbicidal action.

|  | Active ingredient | | | | |
|---|---|---|---|---|---|
|  | I | II | III | IV | V |
| Crop plants |  |  |  |  |  |
| Zea mays | 0 | 0 | 0 | 0 | 35 |
| Gossypium hirsutum | 0 | 0 | 0 | 0 | 5 |
| Soja hispida | 0 | 0 | 0 | 0 | 30 |
| Unwanted plants |  |  |  |  |  |
| Poa trivialis | 95 | 80 | 75 | 75 | 95 |
| Lolium multiflorum | 90 | 75 | 70 | 70 | 90 |
| Echinochloa crus-galli | 90 | 80 | 75 | 75 | 95 |
| Digitaria sanguinalis | 85 | 75 | 70 | 70 | 90 |
| Setaria spec. | 80 | 75 | 70 | 70 | 80 |

0 = no damage
100 = complete destruction 4-trifluoromethyl-2,6-dinitro-N-propyl-N-β-(N'-methylcarbamoyloxy)-propylaniline has action corresponding to II.

EXAMPLE 4

30 parts by weight of the compound of Example 2 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted dinitroaniline of the formula

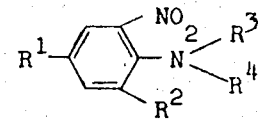

where one of the radicals $R^1$ and $R^2$ denotes nitro and the other denotes methyl, trifluoromethyl or methylsulfonyl, $R^3$ denotes N-methylcarbamoyloxyethyl, 2-(N-methylcarbamoyloxy) propyl, N-ethylcarbamoyloxyethyl, or 2-(N-ethylcarbamoyloxy) propyl, and $R^4$ has the same meanings as $R^3$ and may additionally denote hydrogen bromoethyl, alkylthioalkyl, or linear or branched alkyl having up to 4 carbon atoms, linear or branched alkenyl having up to 4 carbon atoms, linear or branched alkynyl having up to 4 carbon atoms, hydroxyethyl, 2-hydroxypropyl, alkoxyalkyl, or chloroethyl.

2. A substituted aniline as claimed in claim 1 wherein $R^4$ denotes methoxyethyl, n-propyl, allyl, propargyl or hydrogen.

3. N-methoxyethyl-N-(N-methylcarbamoyloxyethyl)-2,6-dinitro-4-trifluoromethylaniline.

4. N-β-(methylcarbamoyloxy)-ethyl-2,6-dinitro-4-trifluoromethylaniline.

5. 4-trifluoromethyl-2,6-dinitro-N-propyl-N-β-(N'-methylcarbamoyloxy)-propylaniline.

* * * * *